(12) United States Patent
Shin et al.

(10) Patent No.: US 7,899,607 B2
(45) Date of Patent: Mar. 1, 2011

(54) OPEN-LOOP CONTROL METHOD FOR CANCELLING ENGINE INDUCED NOISE AND VIBRATION

(75) Inventors: Kwang-Keun Shin, Rochester Hills, MI (US); David J. Verbrugge, Milford, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 762 days.

(21) Appl. No.: 11/946,219

(22) Filed: Nov. 28, 2007

(65) Prior Publication Data

US 2009/0133949 A1    May 28, 2009

(51) Int. Cl.
    *B60K 5/00*    (2006.01)
(52) U.S. Cl. .................................... 701/111; 73/117.03
(58) Field of Classification Search .................. 701/101, 701/102, 111; 180/300; 73/116.01–118.02
    See application file for complete search history.

(56) References Cited

U.S. PATENT DOCUMENTS

| 5,186,136 | A | 2/1993 | Kadomukai et al. |
| 7,000,578 | B2 * | 2/2006 | Eiraku ........................ 123/90.15 |
| 7,350,405 | B2 * | 4/2008 | Sheikh et al. .............. 73/114.04 |

FOREIGN PATENT DOCUMENTS

| JP | 64-066450 A | 3/1989 |
| JP | 06-081708 A | 3/1994 |
| JP | 2000-205029 A | 7/2000 |

* cited by examiner

*Primary Examiner* — Richard M. Camby
(74) *Attorney, Agent, or Firm* — John A. Miller; Miller IP Group, PLC

(57) ABSTRACT

An open-loop control system that provides control signals to active engine mounts to reduce or eliminate the transfer of engine vibration to a vehicle body structure, where the system uses only a crank signal from the engine as an input. The control system includes an instant crank speed variation sensing processor that receives the crank signal from the engine, where the crank signal is a pulsed signal including missing pulses as a result of teeth missing on the vehicle crank wheel. The crank speed variation sensing processor provides a measurement of the instant crank speed variation of the crank signal and minimizes an error in the measurement as a result of the missing pulses. The crank speed variation sensing processor outputs a crank speed sensing variation signal as a sine wave that identifies order content in the crank pulse signal.

20 Claims, 9 Drawing Sheets

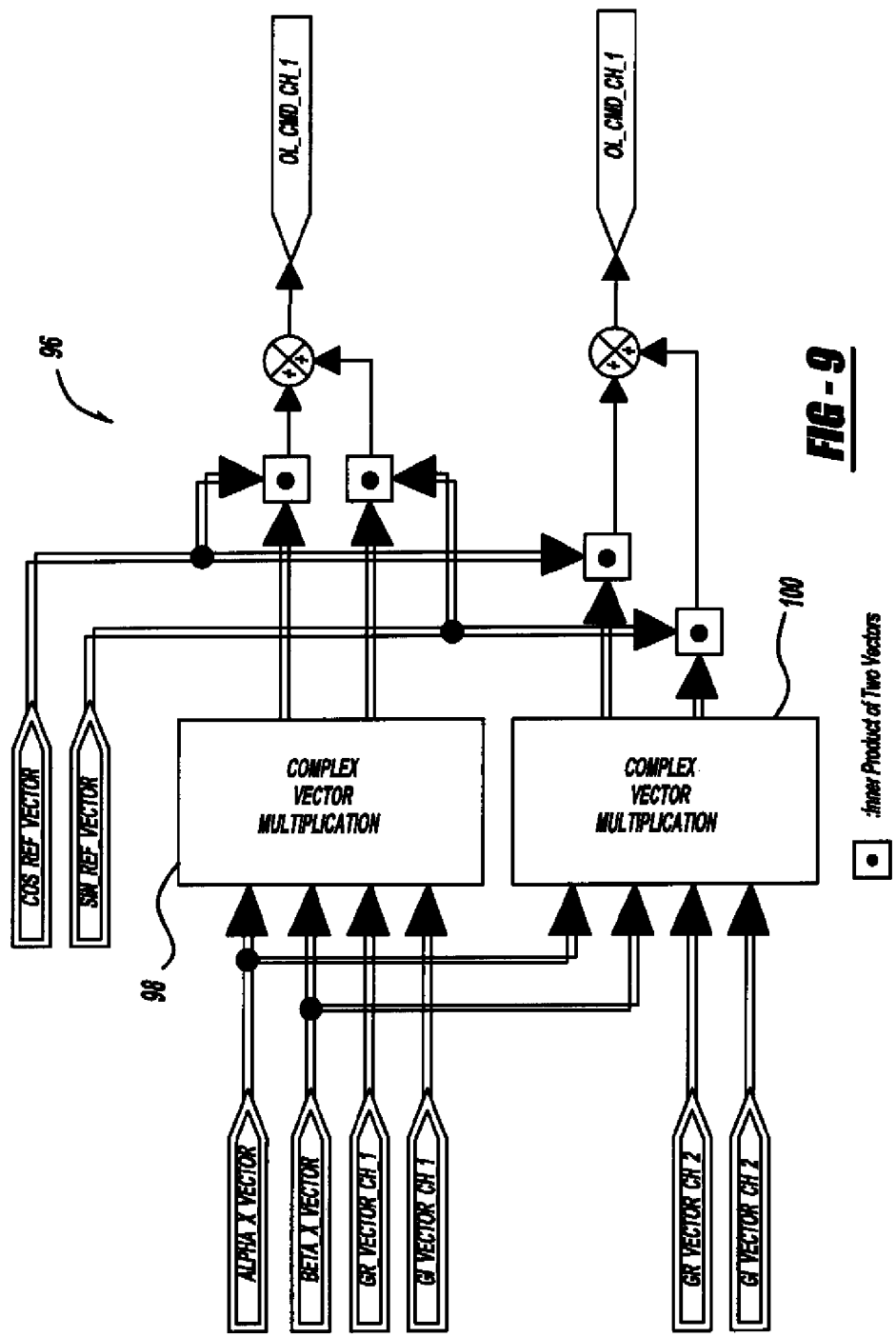

OPEN-LOOP CONTROL METHOD FOR CANCELLING ENGINE INDUCED NOISE AND VIBRATION

BACKGROUND OF THE INVENTION

1. Field of the Invention

This invention relates generally to a system and method for controlling the vibration of an engine in a vehicle and, more particularly, to a system and method for providing open-loop control of active engine mounts based on engine crank pulses to prevent engine vibration from being transferred to the vehicle body structure.

2. Discussion of the Related Art

Active noise control and active vibration control are generally used to reduce noise and vibration induced by engines in vehicles. Typically, active noise control uses speakers to cancel engine noise whose frequency and phase are synchronized with the crank speed and angle of the engine. Active vibration control typically employs active actuators, such as active engine mounts, to cancel engine induced vibration whose frequency and phase are also synchronized with the crank speed.

The magnitude of the engine induced noise and vibration is proportional to the torque variation of the engine, which is proportional to the instant crank speed variation. Therefore, by measuring the instant crank speed variation, appropriate control signals that drive speakers or active actuators can be generated accordingly. A control scheme that depends only on crank speed and angle information is typically referred to as open-loop control in that there are no other vibrations sensors, such as microphones, accelerometers or force transducers. Open-loop control is a cost effective solution over close-loop control, but requires more complicated control algorithms.

It has been proposed in the art to increase vehicle fuel economy by shutting down half of the eight cylinders or six cylinders in certain vehicles during times were half the cylinders would be sufficient to operate the vehicle under the current conditions. Because the engine mounts and other structural elements are designed for high frequency vibrations when all of the cylinders are operating, the frequency induced by the engine when half of the cylinders are turned off typically causes the engine to vibrate more rigorously, which may be transferred to the body structure of the vehicle. Further, when half of the cylinders are shut down, the other cylinders may be required to generate more torque to meet the demand for power, which requires more fuel for the pistons to push with more force. This also adds more vibration to the engine which could be transferred to the vehicle body structure.

SUMMARY OF THE INVENTION

In accordance with the teachings of the disclosed embodiments, an open-loop control system is disclosed that provides control signals to active engine mounts to reduce or eliminate the transfer of engine vibration to a vehicle body structure, where the system uses only a crank signal from the engine as an input. The control system includes an instant crank speed variation sensing processor that receives the crank signal from the engine, where the crank signal is a pulsed signal including missing pulses as a result of teeth missing on the vehicle crank wheel. The crank speed variation sensing processor provides a measurement of the instant crank speed variation of the crank signal and minimizes an error in the measurement as a result of the missing pulses. The crank speed variation sensing processor outputs a crank speed sensing variation signal as a sine wave that identifies order content in the crank signal. The control signal also includes an order reference generation processor that receives the crank signal, and outputs an instant engine speed signal, a vector of an order reference harmonic cosine signal and a vector of an order reference harmonic sine signal. The control system also includes an open-loop look-up table that receives the instant engine speed signal from the order reference generation processor, and outputs a plurality of frequency response vectors identifying order content in the engine speed signal. The control system also includes an order decomposition processor that receives the sensing variation signal from the sensing processor and the vector signals from the order reference generation processor, and composes the sensing variation signal into order content of interest to provide Fourier coefficients of the vector signals. The control signal also includes a command realization processor that receives the plurality of response vectors from the open-loop look-up table, the Fourier coefficients from the order decomposition processor and the vector signal from the order reference generation processor. The command realization processor outputs control signals that control the engine mounts. The control system may also include a half cylinder mode detection processor that receives the Fourier coefficients from the order decomposition processor so as to deactivate the control signals when the engine is only using half of it's cylinders.

Additional features of the present invention will become apparent from the following description and appended claims, taken in conjunction with the accompanying drawings.

BRIEF DESCRIPTION OF THE DRAWINGS

FIG. 9 is a schematic block diagram of the command realization processor in the system shown in FIG. 1.

DETAILED DESCRIPTION OF THE EMBODIMENTS

The following discussion of the embodiments of the invention directed to a system and method employing open-loop control of active engine mounts to reduce engine vibration transfer to a vehicle body structure using only crank shaft pulses is merely exemplary in nature, and is in no way intended to limit the invention or it's applications or uses.

Figure 1:
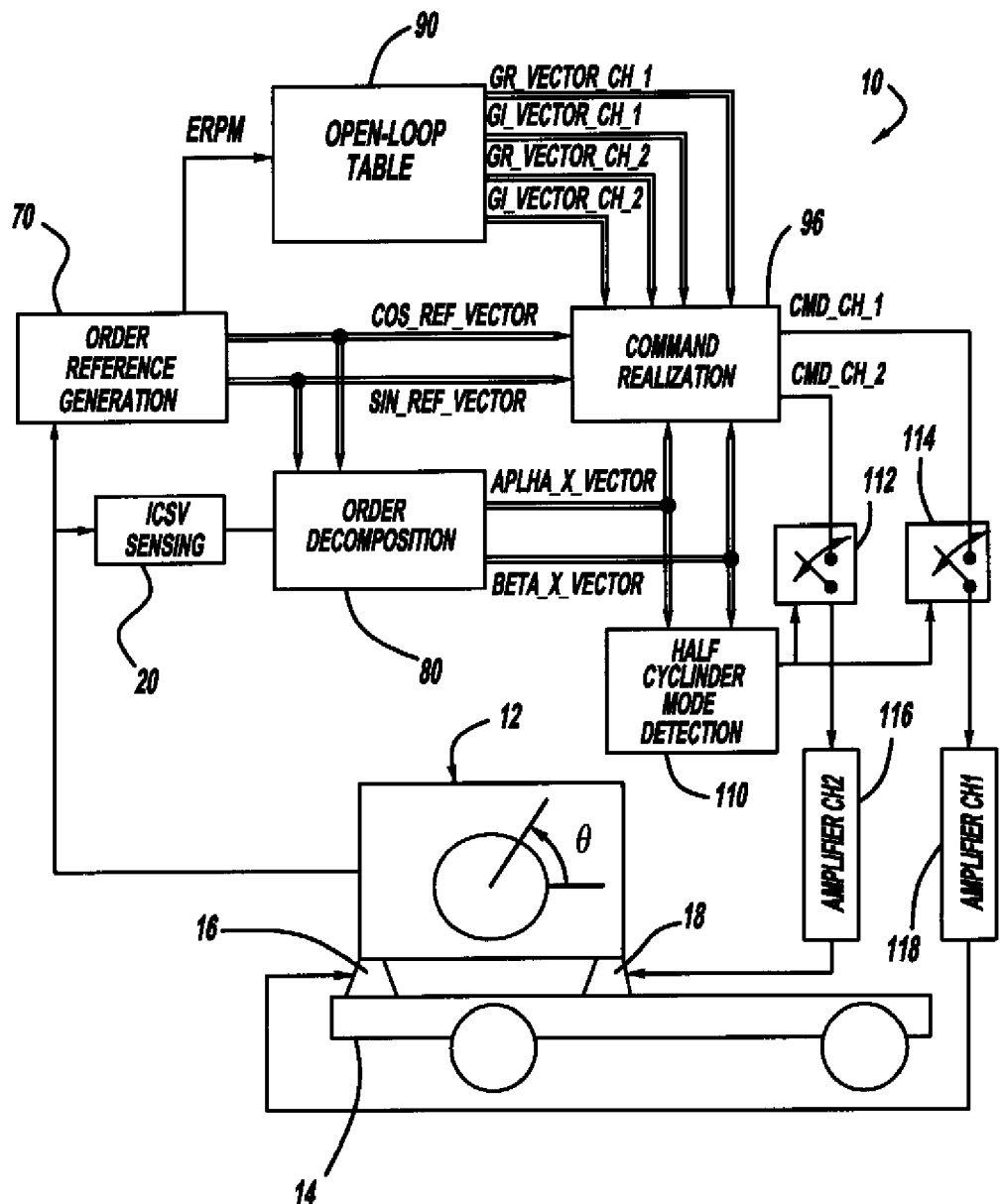
FIG. 1 is a schematic block diagram of an open-loop control system for controlling active engine mounts between an engine and a vehicle body structure, according to an embodiment of the present invention.

FIG. 1 is a schematic block diagram of a control system 10 that reduces or eliminates engine vibration transfer from a vehicle engine 12 to a vehicle body structure 14. The engine 12 is intended to represent any engine that may transfer vibrations to a vehicle body structure, such as four cylinder engines, six cylinder engines, eight cylinder engines, diesel engines, etc. The engine 12 is mounted to the body structure 14 by two active engine mounts 16 and 18 in this non-limiting embodiment. The engine mounts 16 and 18 are active because they are able to be controlled to provide movement in an opposing direction from motion of the engine 12 so that engine motion is not transferred to the body structure 14. Particularly, the active mounts 16 and 18 can be shortened and lengthened so that when they are properly controlled they will be shortened in response to a force into the mount and will be lengthened in response to a force away from the mount. Various types of engine mounts that operate in this manner are well known to those skilled in the art. Accordingly, it is contemplated by the present invention that other mounting configurations may be utilized without departing from the scope of the present invention.

When a vehicle engine is running, the instantaneous speed of the engine crank shaft changes with engine cycle. The crank shaft is accelerated with the firing of the cylinder and decelerated with friction and load. The acceleration and deceleration events occur repeatedly resulting in a periodic variation of crank shaft speed. Because the crank speed variation is due to engine firing, the magnitude and the pulse of the crank speed variations relative to crank angle is an indication of the magnitude and the phase of the torque pulse that produces the engine induced vibration. Therefore, based on the instant crank speed variation and engine RPM, an open-loop control table can be designed that models engine vibration, which can then be used to effectively control the engine mounts 16 and 18.

Figure 2:
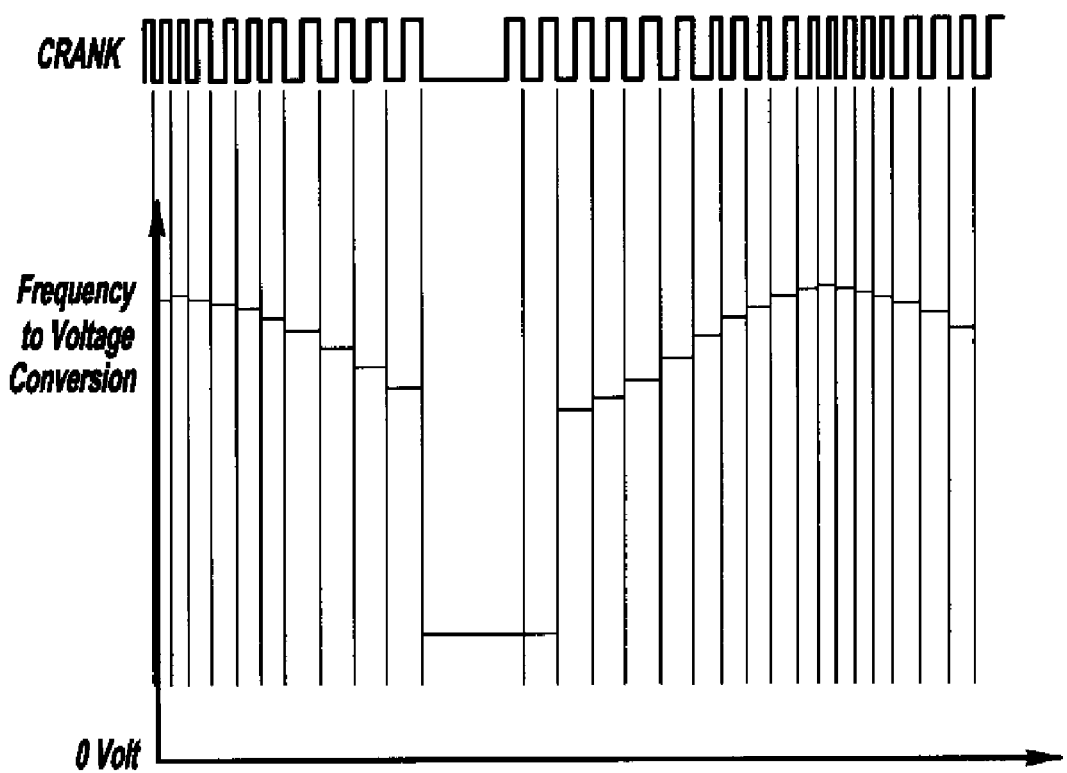
FIG. 2 is a graph with time on the horizontal axis and frequency-to-voltage conversion on the vertical axis showing crank shaft pulses and a conversion of the crank shaft pulses to a voltage.

In one vehicle design, the crank pulses are generated every six degrees of crank angle. In principle, the instant speed of the crank shaft can be obtained by measuring the period of each pulse and inverting it. If the crank pulses are regularly spaced in angle, a simple frequency-to-voltage conversion can be used to detect the instant crank speed variation. However, the actually crank signal has two missing pulses every revolution because two of the teeth are generally missing on the crank wheel to identify the position of the crank wheel. Because of the two missing pulses, a simple frequency-to-voltage conversion produces a large error once every revolution. This can be demonstrated by the graph shown in FIG. 2 that provides frequency-to-voltage conversion on the vertical axis and time on the horizontal axis. The crank shaft signal is shown at the top of the graph illustrating the two missing teeth where the different spaced pulses represent the speed of the crank shaft, as discussed above.

The once-per-revolution error needs to be minimized to ensure precise measurement of the instantaneous crank speed variation. In order to minimize this error, the crank signal from the engine 12 is sent to an instant crank speed variation (ICSV) sensing processor 20 to provide a precise measurement of the instant crank speed variation to minimize the once-per-revolution error due to the missing pulses of the crank shaft signal. The processor 20 first measures the period of a crank pulse from one falling edge to the next. This can be done using a counter with a fast clock. Since the range of a typical engine speed is between 500 and 10,000 RPM, the range of a typical pulse period $T_P$ based on 60 pulses per revolution is between 100 microseconds and 2000 microseconds. This requires at least a 1 Mhz or faster clock speed.

Figure 3:
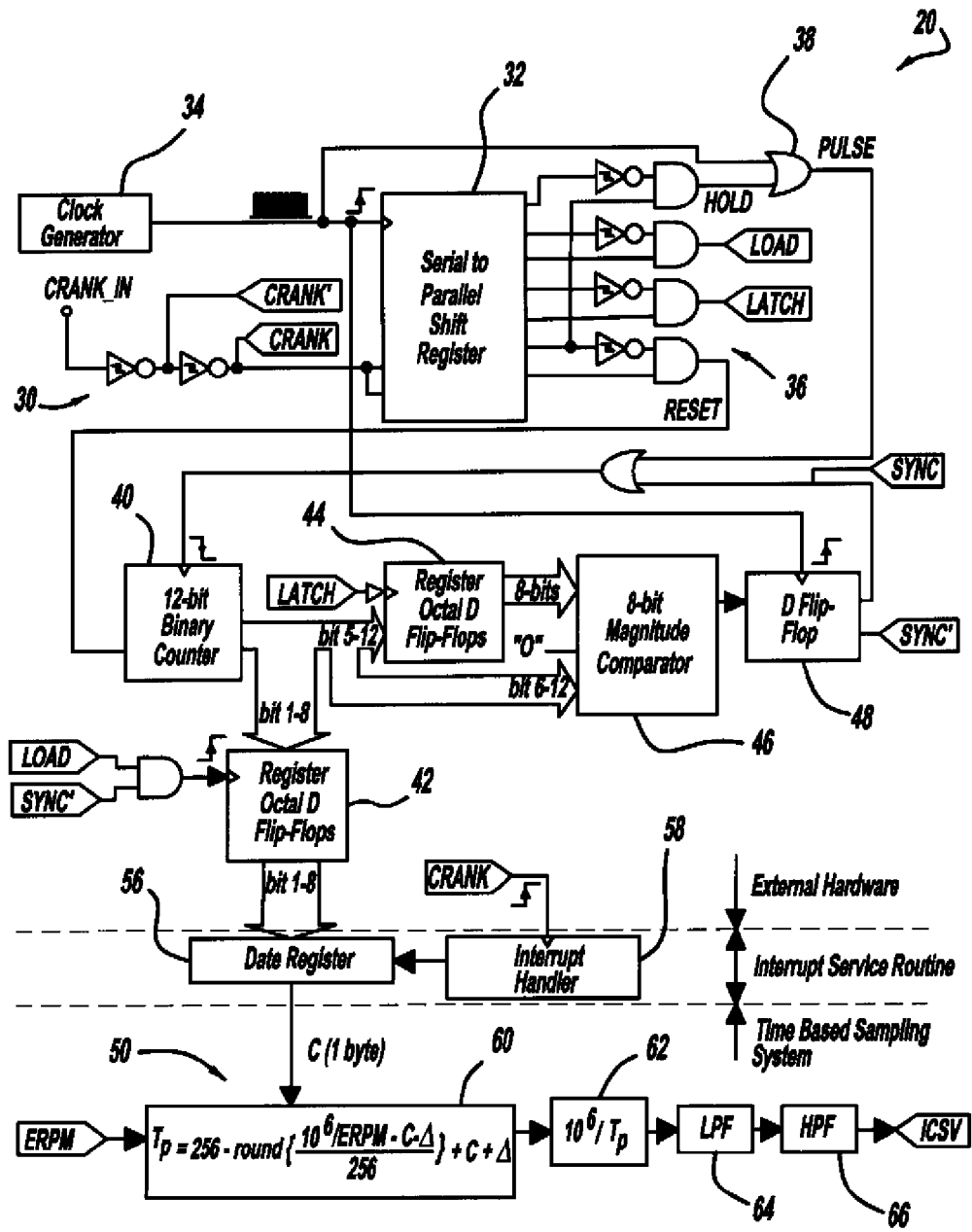
FIG. 3 is a schematic block diagram of an instant crank speed variation sensing processor in the system shown in FIG. 1.
Figure 4:
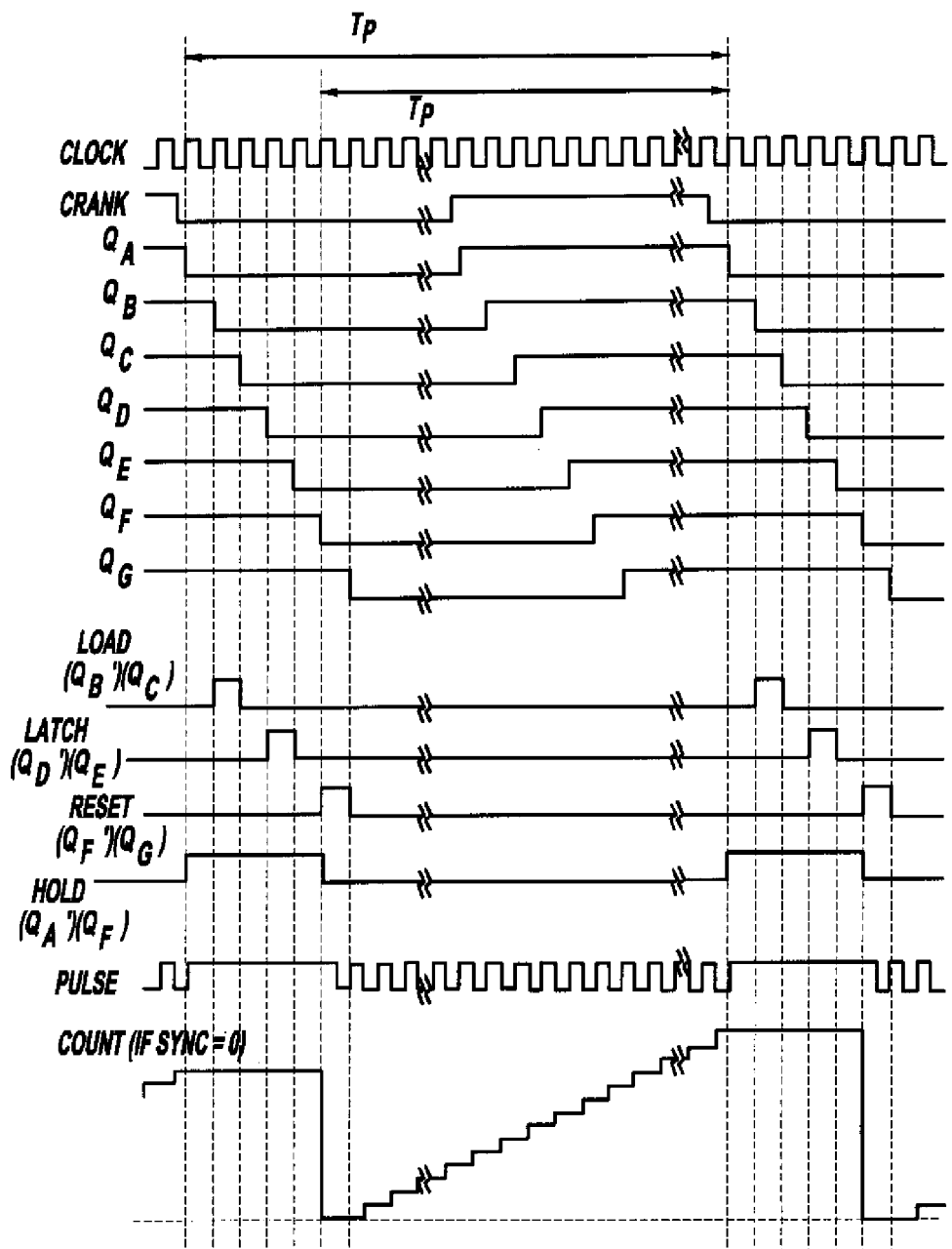
FIGS. 4 and 5 are timing diagrams for instant crank speed detection logic used in the instant crank speed variation sensing processor shown in FIG. 3.
Figure 5:
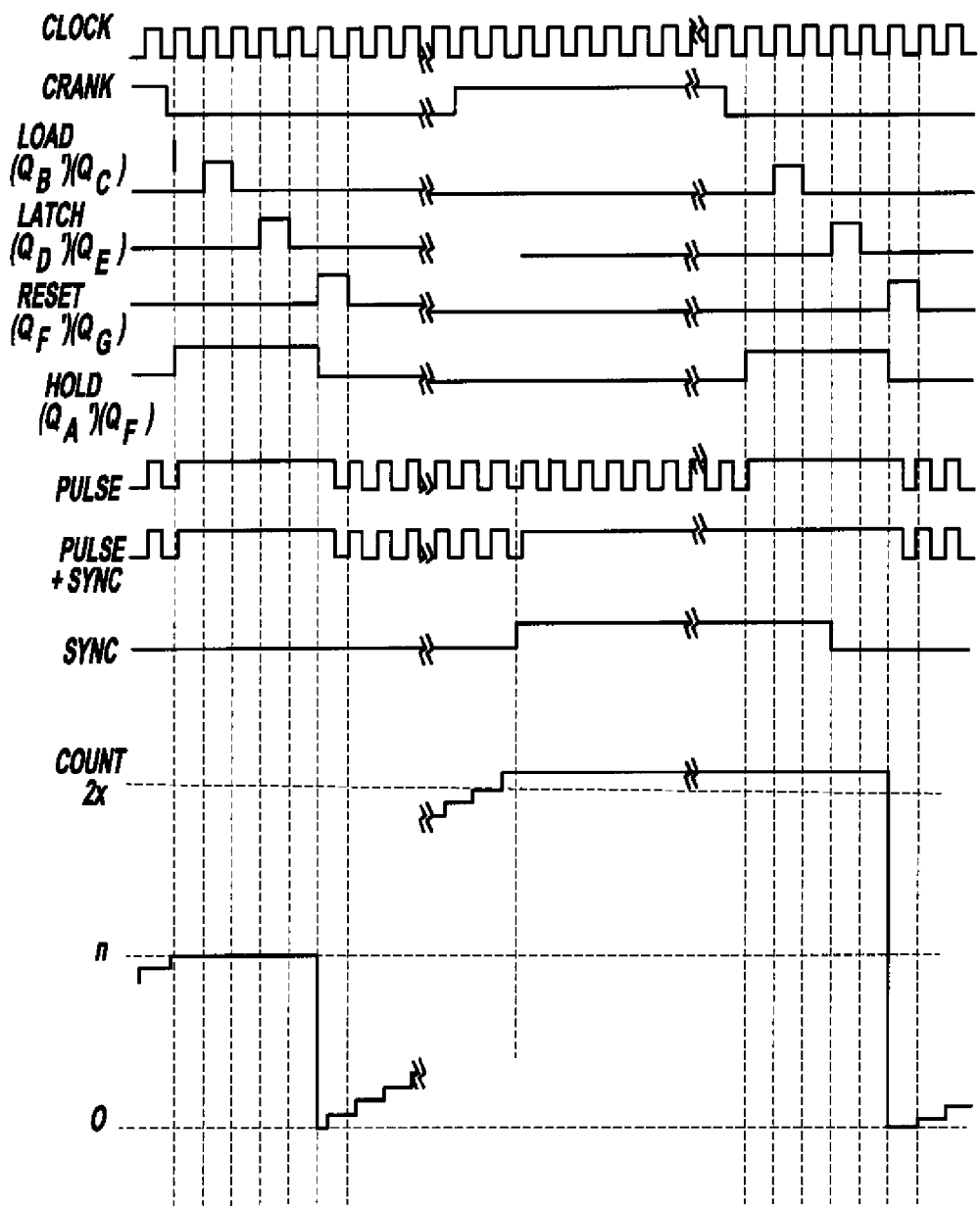

FIG. 3 is a schematic block diagram of the ICSV sensing processor 20, FIG. 4 is a timing diagram for the logic of ICSV processor 20 away from the missing crank teeth and FIG. 5 is a timing diagram for the logic of ICSV sensing processor 20 around the missing crank teeth. A count of the clock pulses starts at 5 ms after a falling edge of the crank pulse and ends at the next falling edge. After the counting is finished, the final count which corresponds to the time period $T_P^*$ should be stored for further processing and the counter should be reset within 5 ms to begin the next pulse period count. The process of data storing and counter resetting requires several timing control signals including LOAD, LATCH, RESET and HOLD.

The crank signal is applied to a Schmitt trigger 30 and then to a serial-to-parallel shift register 32. A clock signal is also applied to the shift register 32 from a clock generator 34. Output signals from the shift register 32 include $Q_A$, $Q_B$, $Q_C$, $Q_D$, $Q_E$, $Q_F$ and $Q_G$ as shown in the timing diagrams. These signals are applied to a series of AND gates 36 and an OR gate 38 that provide the LOAD, LATCH, RESET, HOLD and PULSE signals shown in the timing diagrams. To generate the timing controls signals, the CRANK signal is delayed by several clock periods using the shift register 32 to generate the delayed crank signals $Q_A$, $Q_B$, . . . , $Q_F$. The timing control signals are generated from delayed crank signals by using combinational logic. The PULSE signal is also generated by combining the HOLD signal and the CLOCK signal.

The procedure for data loading and resetting is as follows. At the falling of the signal $Q_A$, right after the falling edge of the CRANK signal, the HOLD signal is activated and a counter 40 holds this value to accommodate the data transfer. At the next clock pulse, the LOAD pulse is activated to load the counter value to a register. At the next clock pulse, the LOAD pulse is deactivated. At the next clock pulse, the LATCH pulse is activated to store the counter value to be used for missing teeth detection. At the next clock pulse, the LATCH pulse is deactivated. At the next clock pulse, the HOLD is deactivated to allow for counting. At the same time, the RESET signal is activated to reset the counter value in the counter 40. At the next clock pulse, the RESET signal is deactivated to start a new count.

Ideally, the counter 40 should count the number of clock periods from one falling edge of the crank signal to the next falling edge of the crank signal to obtain the pulse period $T_P$. However, the timing control signal requires six clock cycles, which is 6 ms for a 1 MHz clock signal. Therefore, the counter 40 actually measures the pulse period $T_P^*$ which is six clock periods shorter than the pulse $T_P$. Since the six clock period error is fixed, it can be compensated for later.

Although the falling-to-falling edge time of each regular crank pulse is slightly different from another pulse and the purpose of the entire procedure is to detect the variations, the pulse period difference between two subsequent pulses is very small. When two pulses are missing, the edge-to-edge time is about three times longer than that of the regular pulse of that immediately following the missing teeth. This means that the edge-to-edge time with the missing teeth is at least two times longer than the previous edge-to-edge time. Therefore, the missing teeth can be detected by comparing two adjacent edge-to-edge times. The basic idea is to check if the transient counter value is twice or larger than the previous edge-to-edge time stored in the memory period. If so, the processor 20 sets the SYNC flag until the counter resets, as shown in FIG. 5.

The final counter value is loaded in a register 42 for data transfer to a microcontroller 60 in a time-based sampling system 50 through a data register 56 and also in a register 44 to detect the missing pulse. Only the least significant eight bits of the counter value from the counter 40 are loaded into the register 42 and only the most significant eight bits of the counter value are loaded into the register 44.

Figure 6:
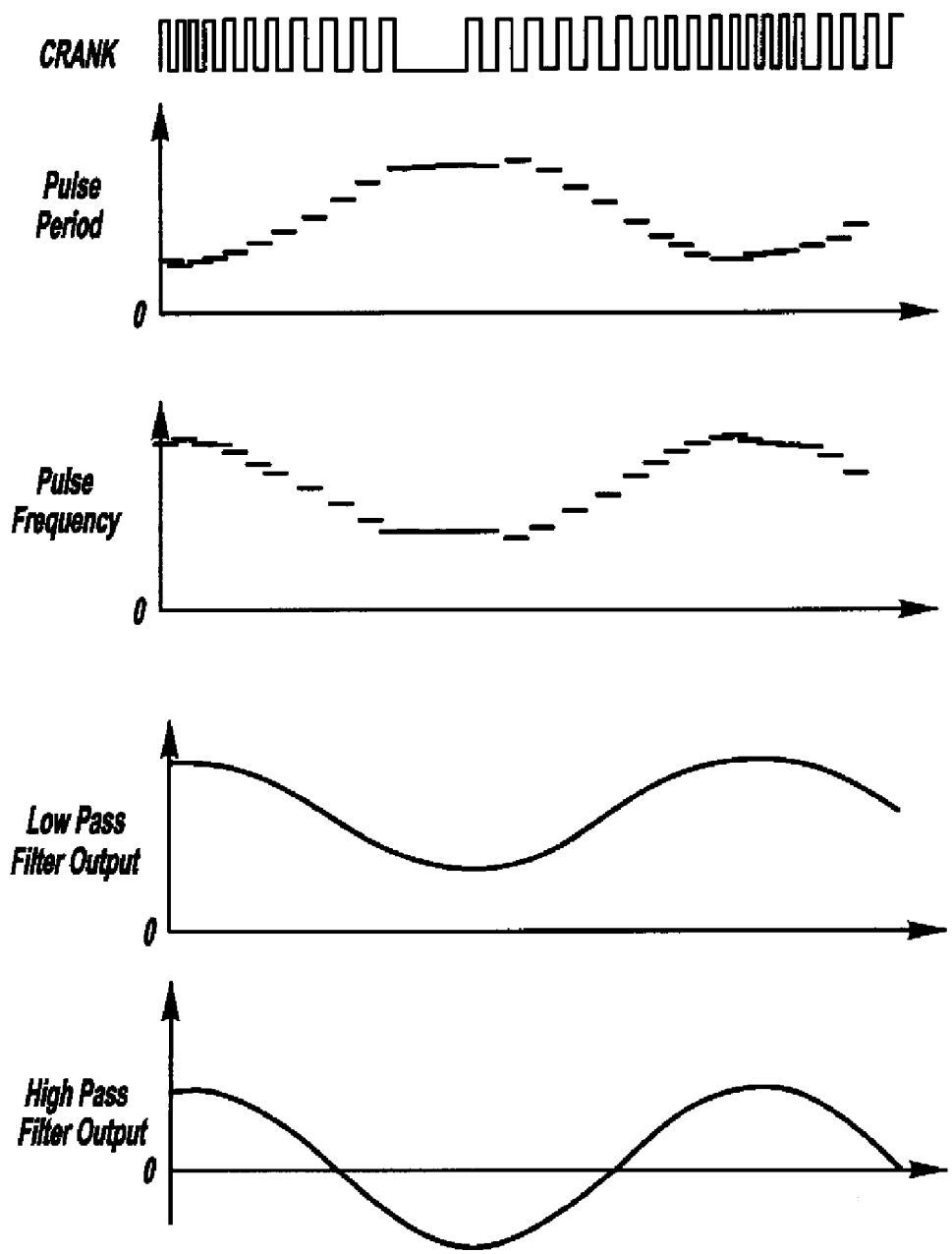
FIG. 6 is a series of timing diagrams for signals in the instant crank speed variation processor shown in FIG. 3.

Because a rough edge-to-edge time is enough to compare the missing pulse, only the most significant seven bits of the counter value are added. The register 44 stores the eight most significant bits of the previous final counter value period. The stored bits from a word are sent to a magnitude comparator 46. At the same time, the seven most significant bits of the transient counter value are stored to form an eight bit word with zero as the most significant bit. This action is equivalent to dividing the counter value by two. The magnitude comparator 46 compares the transient counter value with the stored value, which is twice the previous count. For regular pulses, the transient counter value never exceeds twice the previous final count. Therefore, the comparison of the result A<B is zero, where A is the counter value stored in the register 42 and B is the counter value stored in the register 44. The transient counter value can exceed the doubled previous count only when the counter 40 is counting the edge-to-edge time of the missing teeth. When the counter 40 resets, the result A<B returns to zero. A<B is then sent to a 1-bit D flip-flop 48 to avoid data transition errors. FIG. 6 shows the timing diagram of the missing teeth detection logic.

The SYNC signal is then combined with the PULSE signal to hold the counter value until the next reset to prevent possible overflow. It is now assured that the LOAD signal right after the missing teeth is activated only when the SYNC signal is active. Therefore, the SYNC signal is used to block the register 42 from updating the value.

The data in the register 42 is fetched to the microcontroller 60 using an interrupt handler 58 employing an interrupt service routine triggered by the rising edge of the crank pulse, where the data is stored in the data register 56 before being sent to microcontroller 60. This scheme is to prevent asynchronous data transfer by assuring that the data in the register 42 is always ready at the rising edge of the crank pulse.

Once the data is fetched, the time based sampling algorithm in the microcontroller 60 calculates the instant current speed variation. Since the data contains only the eight least significant bits of the pulse period count to reduce the number of bit connection, the ICSV sensing algorithm needs to recover it to get the pulse period in microseconds. The pulse width $T_P$ of the crank pulse can be given as:

$$T_P = 256 \cdot n + c + \Delta \quad (1)$$

Where n is an unknown integer, c is the eight bit pulse period count, and $\Delta$ is the time used for the timing control, such as 6 ms.

Now the algorithm needs to find the values n and T with the given values c and $\Delta$. From the reference sinusoid generation discussed above, the crank frequency, and thus, the average pulse period of the crank pulse in known. The average pulse period is calculated from the following equations.

$$T_{average}(\mu s) = 10^6 / ERPM \quad (2)$$

Subtracting equation (2) from equation (1) gives:

$$T - T_{average} = 256 \cdot n + c + \Delta - 10^6 / ERPM \quad (3)$$

Because the left side of equation (3) is very small, the best estimate of the value n is:

$$n = \text{round}\{(10^6 / ERPM - c - \Delta)/256\} \quad (4)$$

Therefore, the actual time period T is:

$$T = 256 \cdot \text{round}\{(10^6 / ERPM - c - \Delta)/256\} + c + \Delta \quad (5)$$

The pulse period $T_P$ is inverted by an inverter 62 to yield the pulse frequency. Then, the signal is low pass filtered by a low pass filter (LPF) 64 to smooth the discrete steps, and then high pass filtered by a high pass filter (HPF) 66 to remove the DC component. The signals processed in the system 50 are shown in the timing diagrams in FIG. 6.

The ICSV output signal from the ICSV sensing processor 20 is a sine wave that identifies the order content of the crank signal. The ICSV signal includes information as to when to control the mounts 16 and 18 and how much to control the mounts 16 and 18 based on engine revolutions. This information is extracted from the sine wave by an order decomposition processor 80 discussed below.

The crank signal is also sent to an order reference generation processor 70. The processor 70 outputs instant engine speed (EPRM) signals and reference vectors of order harmonic cosine and sine signals, referred to as the values COS_RAF_VECTOR and SIN_RAF_VECTOR, respectively. The COS_RAF_VECTOR value is an array of order reference cosines at a current time step as:

$$\text{COS\_REF\_VECTOR}(i) = \cos\left(\frac{i}{2}\theta(k)\right) \quad (6)$$

$$(i = 1, 2, \ldots, 8)$$

Where $\theta(k)$ is the crank angle at the current time step. Therefore, for example, the processor 70 outputs eight order reference cosine values from half order up to fourth order.

The SIN_RAF_VECTOR value is similar to the COS_RAF_VECTOR value except it is an order reference sine as:

$$\text{SIN\_REF\_VECTOR}(i) = \sin\left(\frac{i}{2}\theta(k)\right) \quad (7)$$

$$(i - 1, 2, \ldots, 8)$$

The details of one suitable example of the order reference generation processor 70 can be found in U.S. patent application Ser. No. 11/535,525, titled Method and Apparatus for Generating crankshaft Synchronized Sine Wave, filed Sep. 27, 2006, assigned to the assignee of this application and herein incorporated by a reference.

Figure 7:
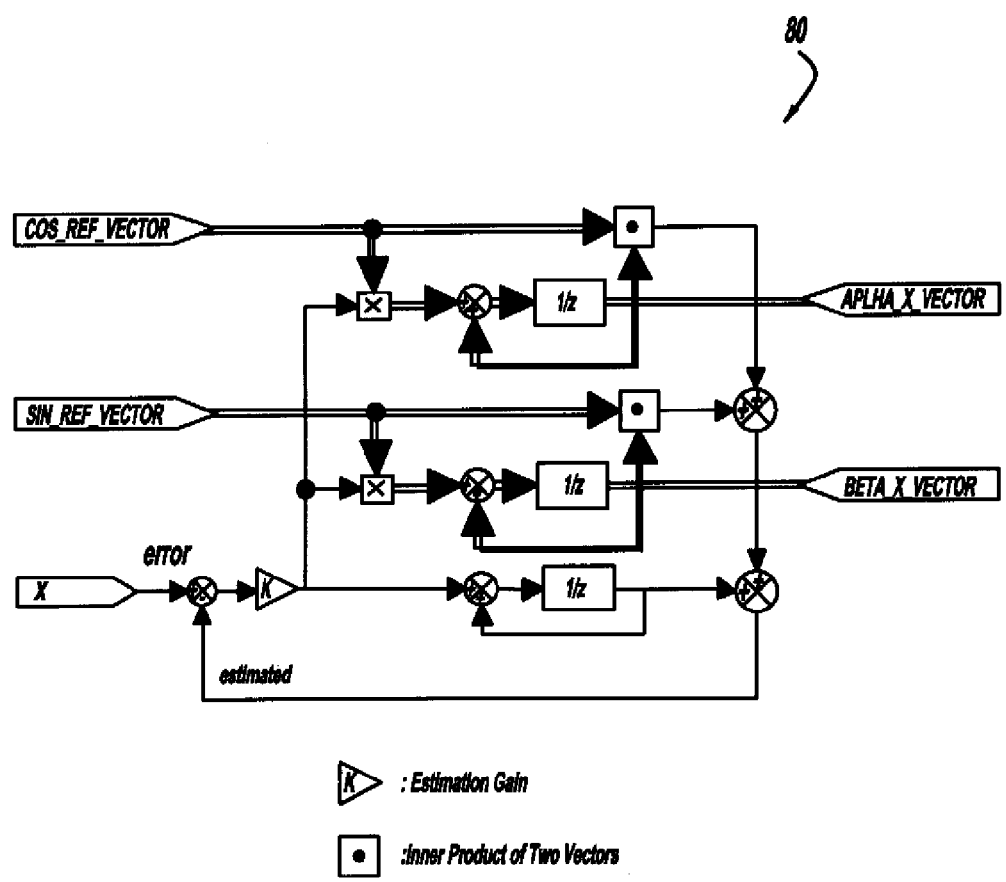
FIG. 7 is a schematic block diagram of an order decomposition processor in the system shown in FIG. 1.

The ICSV signal usually contains several orders and noise. For example, a V6 AFM mode contains a $1.5^{th}$ order and a $3^{rd}$ order ICSV. Similarly, a V8 AFM mode contains a $2^{nd}$ order and a $4^{th}$ order ICSV. Therefore, the ICSV signal needs to be decomposed into the order content of interest. Because the reference cosine and sine values are available, the problem is to find Fourier coefficients of each order. Theoretically, this can be done by using a fast Fourier transform (FFT). However, FFTs require a fast digital signal processor. Also, since the order is not necessarily synchronized in time, a conventional FFT is not suitable for real-time order tracking. The decomposition processor 80 uses a computationally simpler and faster decomposing method, as shown in FIG. 7.

The COS_RAF_VECTOR and SIN_RAF_VECTOR values from the order reference generation processor 70 are sent to the order decomposition processor 80. The order decomposition processor 80 decomposes the ICSV sine wave signal into an order spectrum, and outputs Fourier coefficients of order harmonic cosine and sine identified as ALPHA_X_VECTOR and VETA_X_VECTOR, respectively.

Let the ICSV signal be x(k). The ICSV signal contains a constant that corresponds to average crank speed and multiple order sinusoids, for example, from half order to fourth order every half order increment, which makes eight different orders.

If the ICSV signal is x(k), consider a periodic signal x(k) of a finite Fourier series of the form:

$$x(k) = \alpha_0 + \sum_{i=1}^{n} \alpha_i \cos\left(\frac{i}{2}\theta(k)\right) + \sum_{i=1}^{n} \beta_i \sin\left(\frac{i}{2}\theta(k)\right) \quad (8)$$

Where the angle θ is an arbitrary, but monotonically increasing, function of time, meaning that the period is not a constant.

The problem is to estimate the Fourier coefficients of the ICSV signal x(k). The estimated signal $\hat{x}(k)$ is denoted as:

$$\hat{x}(k) = \hat{\alpha}_0(k) + \sum_{i=1}^{n} \hat{\alpha}_i(k)\cos\left(\frac{i}{2}\theta(k)\right) + \sum_{i=1}^{n} \hat{\beta}_i(k)\sin\left(\frac{i}{2}\theta(k)\right) \quad (9)$$

The parameters $\hat{\alpha}_0(k)$, $\hat{\alpha}_1(k)$, ..., $\hat{\alpha}_n(k)^1$ and $\hat{\beta}(k)$, ..., $\hat{\beta}_n(k)$ can be recursively estimated by using a projection algorithm. One suitable projection algorithm is shown below for convenience, where equation (10) is the signal x(k), equation (11) is the signal estimation $\hat{x}(k)$, equation (12) is the parameter estimation and equation (13) gives convergence conditions.

$$x(k) = \phi^T(k)\delta \quad (10)$$

$$\hat{x}(k) = \phi^T(k)\hat{\delta}(k) \quad (11)$$

$$\hat{\delta}(k+1) = \hat{\delta}(k) + \frac{\gamma\phi(k)}{\varepsilon + \phi^T(k)\phi(k)}(x(k) - \hat{x}(k)) \quad (12)$$

$$\varepsilon > 0, \ 0 < \gamma < 2 \quad (13)$$

To apply a projection algorithm, the signal and parameters need to be rearranged as:

$$\varnothing(k) = \{1 \ \cos(p\theta(k)) \ldots \cos(np\theta(k))\sin(p\theta(k)) \ldots \sin(np\theta(k))\}^T \quad (14)$$

$$\hat{\delta}(k) = \{\hat{\alpha}_0(k)\hat{\alpha}_1(k)\ldots\hat{\alpha}_n(k)\hat{\beta}_0(k)\ldots\hat{\beta}_n(k)\}^T \quad (15)$$

The signal estimation in equation (9) can be rewritten as:

$$\hat{x}(k) = \varnothing^T(k)\hat{\delta}(k) \quad (16)$$

Noting that:

$$\theta^T(k)\theta(k) = 1 + n \quad (17)$$

The parameter estimation in equation (12) can be simplified as:

$$\hat{\delta}(k+1) = \hat{\delta}(k) + K\phi(k)(x(k) - \hat{x}(k)) \quad (18)$$

Where, $$K = \frac{\gamma}{\varepsilon + 1 + n}, \ (\varepsilon > 0, \ 0 < \gamma < 2) \quad (19)$$

Substituting equations (14) and (15) into equation (18) gives the final order decomposition algorithm as:

$$\hat{x}(k) = \hat{\alpha}_0(k) + \Sigma_{i=1}^n \hat{\alpha}_i(k)\cos(ip\theta(k)) + \Sigma_{i=1}^n \hat{\beta}_i(k)\sin(ip\theta(k)) \quad (20)$$

$$\hat{\alpha}_0(k+1) = \hat{\alpha}_0(k) + K\{x(k) - \hat{x}(k)\} \quad (21)$$

$$\hat{\alpha}_i(k+1) = \hat{\alpha}_i(k) + K\{x(k) - \hat{x}(k)\}\cos(ip\theta(t)), (i=1, \ldots n) \quad (22)$$

$$\hat{\beta}_i(k+1) = \hat{\beta}_i(k) + K\{x(k) - \hat{x}(k)\}\sin(ip\theta(t)), (i=1, \ldots, n) \quad (23)$$

Figure 8:
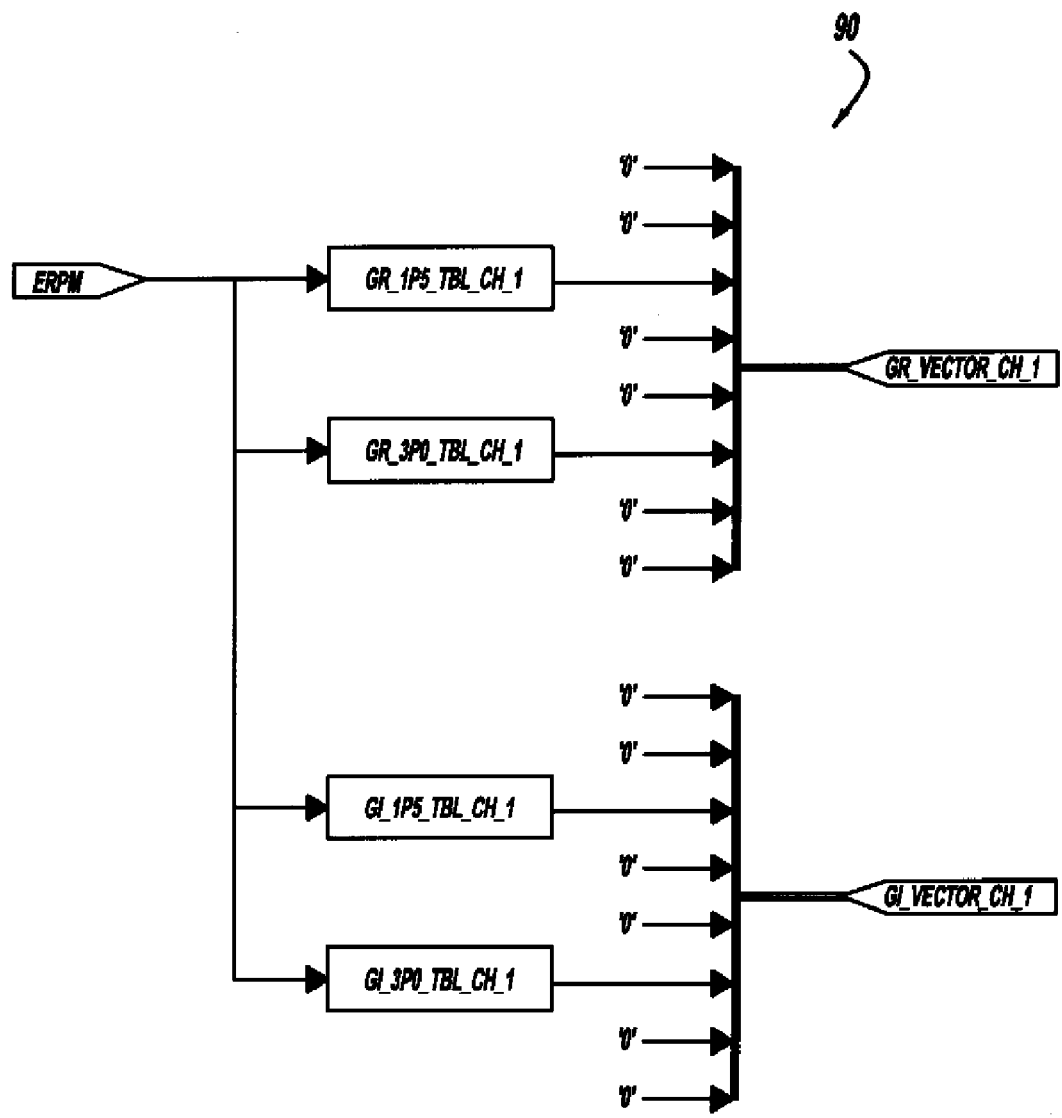
FIG. 8 is a block diagram of an open-loop table used in the system shown in FIG. 1.

The engine speed signal ERPM from the order reference generation processor 70 is sent to an open-loop table 90. The open-loop table 90 outputs frequency response vectors GR_VECTOR_CH_1, GI_VECTOR_CH_1, GR_VECTOR_CH_2 and GI_VECTOR_Ch_2. FIG. 8 is a detailed depiction of the open-loop table 90 showing only the output for channel 1. If only the $1.5^{th}$ order and the $3^{rd}$ order are of interest, two look-up tables are required for each output vector, where 0.5, 1.0, 2.0, 2.5, 3.5 and $4.0^{th}$ order elements of GR_VECTOR_CH_1 are set to zero. The $1.5^{th}$ and the $3.0^{th}$ order elements are filled with the value obtained by look-up tables GR_1P5_TBL_CH_1 and GR_3PO_TBL_CH_1. GR_VECTOR_CH_1 is constructed in the same way as the two look-up tables GR_1P5_TBL_CH_1 and GR_3PO_TBL_CH1.

The Fourier series representation of the control inputs are linear combinations of reference cosine and sine of the form:

$$u_p(k) = \sum_{i=1}^{n} A_{ip}\cos\left(\frac{i}{2}\theta(k)\right) + \sum_{i=1}^{n} B_{ip}\sin\left(\frac{i}{2}\theta(k)\right), \quad (24)$$
$$(j = 1, 2)$$

Where $u_p(k)$ is the $p^{th}$ control input at the current time step.

Since control input $u_p$ is a frequency response of the instant crank speed variation x, with respect to a transfer function $\tilde{G}_p(wi)$, the $(i/2)^{th}$ order frequency response of the control input $u_p$ can be written in complex form as:

$$\tilde{u}_{ip} = \tilde{G}_p(\omega_i)\tilde{x}_i \quad (25)$$

Where, $$\tilde{u}_{ip} = A_{ip} - jB_{ip} \quad (26)$$

$$\tilde{G}_{ip} = [G_{Rp}(\omega_i) + jG_{Ip}(\omega_i)] \quad (27)$$

$$\tilde{x}_i = \alpha_i - j\beta_i \quad (28)$$

By substituting equations (26)-(28) into equation (25), the following equations are obtained.

$$A_{ip} = \alpha G_{Rp}(\omega_i) + \beta G_{Ip}(\omega_i) \quad (29)$$

$$B_{ip} = \beta G_{Rp}(\omega_i) - \alpha G_{Ip}(\omega_i) \quad (30)$$

The frequency response to the functions $\tilde{G}_{Rp}(Wi)$ and $\tilde{G}_{Ip}(wi)$ are measured off-line and are stored in the open-loop table 90.

The system 10 also includes a command realization processor 96, shown in detail in FIG. 9. The processor 96 receives GR_VECTOR_CH_1, GI_VECTOR_CH_1, GR_VECTOR_CH_2 and GI_VECTOR_CH_2 from the open-loop table 90, the ALPHA_X_VECTOR and BETA_X_VECTOR values from the order decomposition processor 80, the and COS_REF_VECTOR and SIN_REF_VECTOR values from the order reference generation processor 70, and calculates output commands CMD_CH1 and CMD_CH2 according to equations (29), (30) and (24).

The ALPHA_X_VECTOR and the BETA_X_VECTOR values from the order decomposition processor 80 are also sent to a half cylinder mode detection processor 110. The processor 110 outputs a half cylinder signal to switches 112 and 114 when appropriate to indicate that the engine 12 is only operating using half of its cylinders. For a V6 engine, the 1.5$^{th}$ order content is the most dominant content of the ICSV sensing signal for half cylinder mode, while the 3$^{rd}$ order is the most dominant content for the full 6 cylinder model. By comparing the magnitude of the 1.5$^{th}$ order and the 3$^{rd}$ order content of the ICSV sensing signal in the processor 110, it can be determined whether the engine 12 is running in a half cylinder mode or a full cylinder mode.

The CMD_CH_1 signal from the command realization processor 96 is applied to a switch 114 and the CMD_CH_2 signal from the command realization processor 96 is applied to a switch 112. When the detection processor 110 detects that the engine 12 is running in the half cylinder mode where a particular cylinder may not be firing, it will open the switches 112 and 114 so that the command signals do not pass through. The CMD_CH_2 signal is sent through the switch 112 to an amplifier 116 that amplifies the signal before it is applied to the mount 18. Likewise, the CMD_CH_1 signal is sent through the switch 114 to an amplifier 118 that amplifies it before it is sent to the mount 16.

The foregoing discussion discloses and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. A control system for reducing engine vibration transfer from a vehicle engine to a vehicle body structure, said engine being mounted to the vehicle structure by at least one active engine mount, said system comprising:
    an instant crank speed variation sensing processor responsive to a crank signal from the engine, said crank signal being a pulsed signal including at least one missing pulse as a result of missing teeth on a crank wheel, said sensing processor providing a measurement of the instant crank speed variation of the crank signal and minimizing an error in the measurement as a result of the at least one missing pulse, said sensing processor outputting a sensing variation signal as a sine wave that identifies order content in the crank signal;
    an order reference generation processor responsive to the crank signal, said order reference generation processor outputting an instant engine speed signal, a vector of an order reference harmonic cosine signal and a vector of an order reference harmonic sine signal;
    at least one open-loop look-up table responsive to the instant engine speed signal from the order reference generation processor, said open-loop table outputting a plurality of frequency response vectors identifying order content in the engine speed signal;
    an order decomposition processor responsive to the sensing variation signal from the sensing processor and the vector signals from the order reference generation processor, said order decomposition processor decomposing the sensing variation signal into order content of interest, and outputting Fourier coefficients of the vector signals; and
    a command realization processor responsive to the plurality of response vectors from the open-loop look-up table, the Fourier coefficients from the order decomposition processor and the reference generation vector signals from the order processor, said command realization processor outputting a control signal that controls the at least one active engine amount.

2. The system according to claim 1 wherein the crank speed variation sensing processor measures the period of the crank pulses from one falling edge of a crank pulse to a next falling edge of a crank pulse, and provides a count of clock periods during each measurement.

3. The system according to claim 2 wherein the crank speed variation sensing processor employs a time based sampling algorithm to calculate the instant current speed variation of the crank signal, and to calculate the pulse width of each pulse in the crank signal.

4. The system according to claim 1 wherein the open-loop look-up table is a plurality of open-loop look-up tables where each look-up table provides a response vector for a particular order in the engine speed signal.

5. The system according to claim 1 wherein the order decomposition processor uses a projection algorithm to Fourier estimate the sensing variation signal using the reference vector signals and a projection algorithm.

6. The system according to claim 1 wherein the command realization processor uses complex vector multiplication to generate the control signals.

7. The system according to claim 1 further comprising a half cylinder mode detection processor responsive to the Fourier coefficients from the order decomposition processor, said half cylinder mode detection processor determining when the engine is only using half of it's cylinders, and deactivating the control signal in response thereto.

8. The system according to claim 7 wherein the half cylinder mode detection processor determines which mode in the Fourier coefficients is most dominate to determine whether the engine is only using half of it's cylinders.

9. The system according to claim 1 further comprising an amplifier responsive to the command signal from the command realization processor, said amplifier amplifying the command signal before it is applied to the active engine mount.

10. The system according to claim 1 wherein the at least one active engine mount is two engine mounts, and wherein the command realization processor provides a command signal for both of the engine mounts.

11. A control system for reducing engine vibration transfer from a vehicle engine to a vehicle body structure, said engine being mounted to the vehicle structure by at least one active engine mount, said system comprising:
    an instant crank speed variation sensing processor responsive to only a crank signal from the engine, said crank signal being a pulsed signal including at least one missing pulse as a result of missing teeth on a crank wheel in the engine, said sensing processor providing a measurement of the instant crank speed variation of the crank signal and minimizing an error in the measurement as a result of the at least one missing pulse, said sensing processor providing a sensing variation signal as a sine wave that identifies order content of the crank signal; and
    a command processor that uses the order content in the crank signal to provide a control signal that controls the at least one active engine mount to reduce the vibration transfer.

12. The system according to claim 11 further comprising an order reference generation processor responsive to the crank signal, said order reference generation processor outputting an instant engine speed signal, a vector of an order reference harmonic cosine signal and a vector of an order reference harmonic sine signal.

13. The system according to claim 12 further comprising at least one open-loop look-up table responsive to the instant engine speed signal from the order reference generation processor, said open-loop table outputting a plurality of frequency response vectors identifying order content in the engine speed signal.

14. The system according to claim 13 further comprising an order decomposition processor responsive to the sensing variation signal from the sensing processor and the vector signals from the order reference generation processor, said order decomposition processor decomposing the sensing variation signal into order content of interest, and outputting Fourier coefficients of the vector signals.

15. The system according to claim 14 further comprising a half cylinder mode detection processor responsive to the Fourier coefficients from the order decomposition processor, said half cylinder mode detection processor determining when the engine is only using half of it's cylinders, and deactivating the control signal in response thereto.

16. The system according to claim 15 wherein the half cylinder mode detection processor determines which mode in the Fourier coefficients is most dominate to determine whether the engine is only using half of it's cylinders.

17. The system according to claim 11 wherein the crank speed variation sensing processor measures the period of the crank pulses from one falling edge of a crank pulse to a next falling edge of a crank pulse, and provides a count of clock periods during each measurement.

18. The system according to claim 17 wherein the crank speed variation sensing processor employs a time based sampling algorithm to calculate the instant current speed variation of the crank signal, and to calculate the pulse width of each pulse in the crank signal.

19. A control system for reducing engine vibration transfer from a vehicle engine to a vehicle body structure, said engine being mounted to the vehicle structure by at least one active engine mount, said system comprising;
- an instant crank speed variation sensing processor responsive to only a crank signal from the engine, said crank signal being a pulsed signal including at least one missing pulse as a result of missing teeth on a crank wheel in the engine, said sensing processor providing a measurement of the instant crank speed variation of the crank signal and minimizing an error in the measurement as a result of the at least one missing pulse, said sensing processor providing a sensing variation signal as a sine wave that identifies order content of the crank signal; and
- at least one open-loop look-up table responsive to an engine speed signal, said open-loop table outputting a plurality of frequency response vectors identifying order content in the engine speed signal.

20. The system according to claim 19 further comprising an order reference generation processor responsive to the crank signal, said order reference generation processor outputting the engine speed signal, a vector of an order reference harmonic cosine signal and a vector of an order reference harmonic sine signal.

* * * * *